(12) United States Patent
Naujok

(10) Patent No.: US 12,316,626 B2
(45) Date of Patent: May 27, 2025

(54) DEVICE AUTHENTICATION VIA HIGH-ENTROPY TOKEN

(71) Applicant: Prove Identity, Inc., New York, NY (US)

(72) Inventor: Jeffrey Robert Naujok, Colorado Springs, CO (US)

(73) Assignee: Prove Identity, Inc., New York, NY (US)

( * ) Notice: Subject to any disclaimer, the term of this patent is extended or adjusted under 35 U.S.C. 154(b) by 879 days.

(21) Appl. No.: 17/475,159

(22) Filed: Sep. 14, 2021

(65) Prior Publication Data

US 2023/0085137 A1    Mar. 16, 2023

(51) Int. Cl.
| | |
|---|---|
| *H04L 9/40* | (2022.01) |
| *H04L 9/08* | (2006.01) |
| *H04W 12/03* | (2021.01) |
| *H04W 12/06* | (2021.01) |

(52) U.S. Cl.
CPC ........ *H04L 63/0838* (2013.01); *H04L 9/0861* (2013.01); *H04L 63/0428* (2013.01); *H04W 12/03* (2021.01); *H04W 12/068* (2021.01); *H04L 2209/80* (2013.01)

(58) Field of Classification Search
CPC ............... H04L 63/0838; H04L 9/0861; H04L 63/0428; H04L 2209/80; H04L 2209/805; H04L 9/14; H04L 9/3228; H04L 9/0869; H04W 12/03; H04W 12/068; H04W 12/069; H04W 12/108; H04W 12/041
See application file for complete search history.

(56) References Cited

U.S. PATENT DOCUMENTS

| | | | |
|---|---|---|---|
| 7,644,434 B2 * | 1/2010 | Pollutro | ................ H04L 63/067 |
| | | | 726/6 |
| 8,606,640 B2 | 12/2013 | Brody | |
| 10,693,872 B1 | 6/2020 | Larson et al. | |

(Continued)

OTHER PUBLICATIONS

U.S. Appl. No. 17/183,208: Final Office Action dated Mar. 9, 2023, 37 pages, Doc 1901.

(Continued)

*Primary Examiner* — Abiy Getachew
(74) *Attorney, Agent, or Firm* — Husch Blackwell LLP; Bryan D. Stewart; Matthew C. Francis

(57) ABSTRACT

Briefly, example methods, apparatuses, and/or articles of manufacture may be implemented to authenticate a communicating device via a communications network. One embodiment may include obtaining, at the communicating device, signals representative of one or more high-entropy tokens via the communications network, the one or more high-entropy tokens including one or more component tokens. The method may additionally include encrypting one or more parameters utilizing a first encryption key derived from at least one component token of the one or more component tokens and transmitting, via the communications network, one or more signals representative of the encrypted one or more parameters. The method may further include obtaining, at the communicating device, one or more signals indicating an outcome of a comparison between the one or more encrypted parameters with one or more similar parameters encrypted by an identity verifier.

30 Claims, 7 Drawing Sheets

(56) References Cited

U.S. PATENT DOCUMENTS

| | | | |
|---|---|---|---|
| 10,868,724 B2* | 12/2020 | Rzezak | G06F 21/602 |
| 11,076,001 B1 | 7/2021 | Mohamad | |
| 11,165,586 B1 | 11/2021 | Rule et al. | |
| 2008/0084870 A1* | 4/2008 | Taylor | H04W 4/02 370/352 |
| 2008/0201401 A1 | 8/2008 | Pugh | |
| 2010/0130169 A1 | 5/2010 | Narayanaswamy et al. | |
| 2011/0047610 A1* | 2/2011 | Mylavarapu | H04L 63/0428 726/12 |
| 2014/0053241 A1 | 2/2014 | Norrman | |
| 2015/0296379 A1 | 10/2015 | Nix | |
| 2016/0105540 A1 | 4/2016 | Kwon | |
| 2016/0277930 A1 | 9/2016 | Li | |
| 2017/0041964 A1 | 2/2017 | Yerli | |
| 2019/0028443 A1* | 1/2019 | Chin | H04L 63/061 |
| 2019/0037401 A1 | 1/2019 | Egner et al. | |
| 2019/0312878 A1 | 10/2019 | Brown et al. | |
| 2019/0327609 A1 | 10/2019 | Schell et al. | |
| 2020/0374694 A1 | 11/2020 | Fan et al. | |
| 2020/0380598 A1* | 12/2020 | Spector | H04L 63/0861 |
| 2020/0412539 A1 | 12/2020 | Uy | |
| 2021/0029522 A1 | 1/2021 | Cao | |
| 2021/0081632 A1 | 3/2021 | Batchu | |
| 2021/0105142 A1 | 4/2021 | Lee et al. | |

OTHER PUBLICATIONS

U.S. Appl. No. 17/407,041: Notice of Publication dated Feb. 23, 2023, pp. 1, Doc 1902.
U.S. Appl. No. 17/407,041: Non-Final Office Action dated Feb. 27, 2023, 32 pages, Doc 1903.
U.S. Appl. No. 17/183,208: Advisory Action dated Aug. 26, 2022, 8 pages, Doc 1854.
U.S. Appl. No. 17/183,208: RCE & Response to Final Office Action dated Sep. 8, 2022, 30 pages, Doc 1855.
U.S. Appl. No. 17/183,208: Non-final Office Action dated Oct. 4, 2022, 29 pages, Doc 1856.
U.S. Appl. No. 17/183,208: Patent Application filed Feb. 23, 2021, 61 pages, Doc 1803.
U.S. Appl. No. 17/183,208: Filing Receipt dated Mar. 10, 2021, 3 pages, Doc 1804.
U.S. Appl. No. 17/183,208: Non-final Office Action dated Jan. 14, 2022, 27 pages, Doc 1805.
U.S. Appl. No. 17/183,208: Amendment filed Apr. 14, 2022, 23 pages, Doc 1806.
PCT/US22/16568: PCT Application filed Feb. 16, 2022, 63 pages, Doc 1807.
PCT/US22/16568: International Search Report and Written Opinion dated Mar. 4, 2022, 13 pages, Doc 1808.
U.S. Appl. No. 17/407,041: Patent Application filed Aug. 19, 2021, 67 pages, Doc 1809.
U.S. Appl. No. 17/407,041: Filing Receipt and Notice to File Missing Parts dated Aug. 31, 2021, 6 pages, Doc 1810.
U.S. Appl. No. 17/407,041: Response to File Missing Parts filed Oct. 7, 2021, 6 pages, Doc 1811.
U.S. Appl. No. 17/407,041: Updated Filing Receipt dated Oct. 13, 2021, 4 pages, Doc 1812.
U.S. Appl. No. 17/183,208: Final Office Action dated Jun. 9, 2022, 29 pages, Doc 1843.
U.S. Appl. No. 17/183,208: Response to Final Office Action dated Aug. 1, 2022, 25 pages, Doc 1844.
U.S. Appl. No. 17/183,208: AFCP Request & Response to Final Office Action filed May 9, 2023, pages, Doc 1956.
U.S. Appl. No. 17/183,208: Advisory Action dated Jun. 2, 2023, pages, Doc 1957.
U.S. Appl. No. 17/183,208: RCE & Amendment filed Jun. 9, 2023, 30 pages, Doc 1958.
U.S. Appl. No. 17/183,208: Notice of Allowance & Allowability dated Jul. 19, 2023, 14 pages, Doc 1959.
BR Application No. 1120230168767: Brazil Application filed Aug. 22, 2023, 39 pages, Doc 1952.
CA Application No. 3209181: Canada Application filed Aug. 21, 2023, 75 pages, Doc 1953.
EP Application No. 22760222.4: European Application filed Aug. 21, 2023, 6 pages, Doc 1954.
IN Application No. 202347056479: India Application filed Aug. 23, 2023, 59 pages, Doc 1955.
U.S. Appl. No. 17/407,041: Response to Non-Final Office Action filed May 30, 2023, 20 pages, Doc 1960.
U.S. Appl. No. 17/407,041: Final Office Action dated Aug. 28, 2023, 21 pages, Doc 1961.
U.S. Appl. No. 17/183,208: Response to Non-Final Office Action filed Jan. 9, 2023, 25 pages, Doc 1869.
PCT Application No. PCT/US22/16568: Demand & Response to Written Opinion filed Dec. 22, 2022, 31 pages, Doc 1880.
PCT Application No. PCT/US22/39174: PCT Application filed Aug. 2, 2022, 65 pages, Doc 1870.
PCT Application No. PCT/US22/39174: International Search Report and Written Opinion dated Dec. 6, 2022, 13 pages, Doc 1871.

* cited by examiner

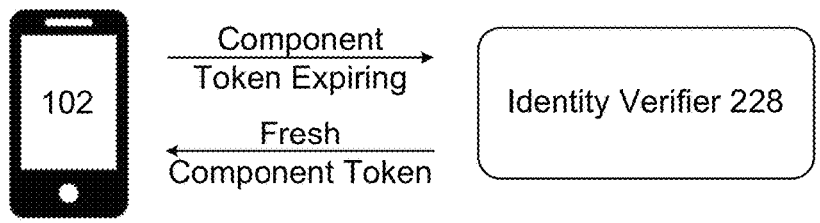
FIG. 4
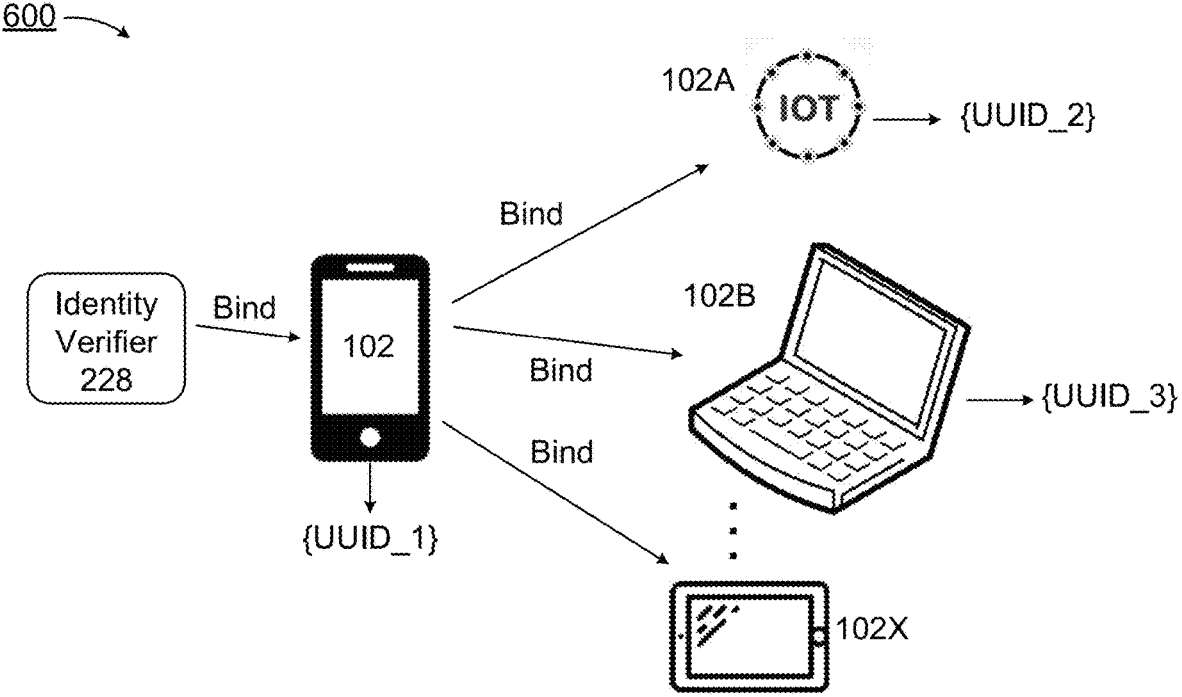
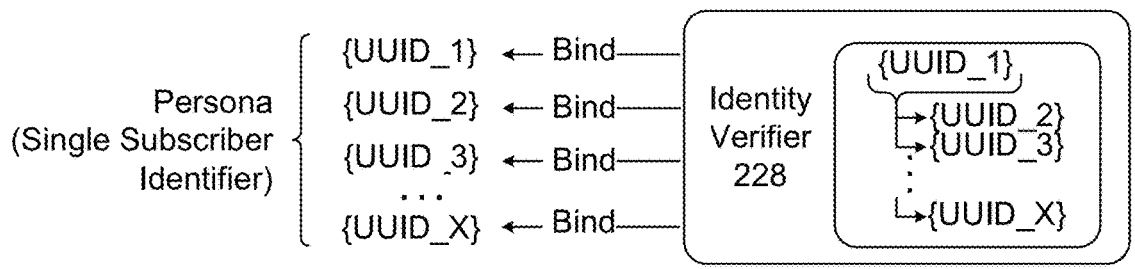
FIG. 6

700

710
Obtain, at the communicating device, signals representative of one or more high-entropy tokens via the communications network, the one or more high-entropy tokens comprising one or more component tokens

715
Encrypt, one or more parameters utilizing a first encryption key derived from at least one component token of the one or more component tokens

720
Transmit, via the communications network, one or more signals representative of the encrypted one or more parameters

725
Obtain, at the communicating device, one or more signals indicating an outcome of a comparison between the one or more encrypted parameters and one or more similar parameters encrypted by an identity verifier

*FIG. 7*

DEVICE AUTHENTICATION VIA HIGH-ENTROPY TOKEN

BACKGROUND

1. Field

The present disclosure relates generally to verifying and/or authenticating devices that communicate electronically, via a communications network, with computing resources at a centralized location, so as to facilitate, for example, financial transactions and/or transactions involving Internet of things (IOT) devices.

2. Information

The World Wide Web or simply the Web, as enabled by Internet computing, routing, and/or wireless transmission resources, has grown rapidly in recent years at least partially in response to the relative ease with which a wide variety of transactions can be performed or enabled via the Internet. As a consequence of widely available Internet connections, including connections to the Internet facilitated by wireless mobile communication services, for example, a mobile subscriber may shop and/or purchase virtually any product or service utilizing a handheld communications device. However, in such an environment, in which electronic, Internet-based commerce has become increasingly common, occurrences of fraud and deception, unfortunately, can also occur.

In addition to facilitating communications among devices having a primary purpose that relates to providing communication services, such as mobile cellular communications devices, the Web also facilitates communication among devices providing other functionalities, such as appliances, industrial, commercial, and household machines, control devices, sensors, etc. In such an environment, which may be referred to as an "Internet of things" (IOT) environment, as well as situations involving devices designed primarily for communications, instances of fraud and deception may bring about unreliable operation, intrusion by unauthorized parties into a user's home network, theft of privileged content, financial and/or credit fraud, and so forth. To reduce a likelihood of fraud, theft, or intrusion by unauthorized parties, fraud-detection and/or user authentication processes may be implemented. Such implementations may be utilized, for example, in connection with numerous types of web-based or electronic transactions or operations. Thus, it may be appreciated that reduction in the instances of fraud and deception, which may involve, for example, use of various types of communicating devices, continues to be an active area of investigation.

SUMMARY

One general aspect includes a method of authenticating a communicating device via a communications network. The method includes obtaining, at the communicating device, signals representative of one or more high-entropy tokens via the communications network, the one or more high-entropy tokens including one or more component tokens. The method also includes encrypting one or more parameters utilizing a first encryption key derived from at least one component token of the one or more component tokens. The method also includes transmitting, via the communications network, one or more signals representative of the encrypted one or more parameters. The method also includes obtaining, at the communicating device, one or more signals indicating an outcome of a comparison between the one or more encrypted parameters with one or more similar parameters encrypted by an identity verifier.

In particular embodiments, the method may further include generating an additional encryption key based, at least in part, on at least one fresh component token. In particular embodiments, the method may further include generating the additional encryption key is based, at least in part, on at least one component token of the one or more component tokens in combination with the at least one fresh component token. In particular embodiments, transmitting the one or more signals is to indicate that at least one expiring component token, of the one or more component tokens, is expiring within a predetermined time period. In particular embodiments, the method may further include generating at least one fresh high-entropy token based, at least in part, on the at least one fresh component token. In particular embodiments, generating the at least one fresh high-entropy token includes appending the at least one fresh component token to a high-entropy token of the one or more high-entropy tokens and may include discarding the at least one expiring component token. In particular embodiments, the method may further include transmitting one or more signals to indicate at least one expiring component token. In particular embodiments, the method may further include transmitting a signal representative of a parameter specific to the communicating device.

Another general aspect includes a method of authenticating a communicating device via a communications network, which includes determining, via a subscriber identifier, whether the communicating device is a known communicating device operating within the communications network. The method of authenticating also includes transmitting signals, representative of one or more high-entropy tokens to the communicating device, the one or more high-entropy tokens including one or more component tokens. In particular embodiments, the method of authenticating also includes obtaining one or more encrypted parameters, the one or more encrypted parameters generated utilizing at least one of the one or more component tokens. The method of authenticating also includes comparing the one or more obtained encrypted parameters with one or more similar parameters encrypted via an identity verifier.

In particular embodiments, the method may additionally include determining that at least one component token is to expire based, at least in part, on one or more indications from the communicating device that a time-to-live parameter is scheduled to expire within a predetermined time period. In particular embodiments, the method may additionally include, responsive to determining that at least one component token has expired, generating a fresh high-entropy token by appending at least one fresh component token to a portion of a high-entropy token of the one or more high-entropy tokens. In particular embodiments, the method may additionally include discarding the at least one expired component token. In particular embodiments the one or more indications from the communicating device are received within a period of no more than 10 days. In particular embodiments, the method may further include generating an upgraded trustworthiness score responsive to receiving the one or more indications received within the period of no more than 10 days. In particular embodiments, the method may further include revoking a bind between or among the identity verifier and the communicating device responsive to passage of a threshold number of consecutive intervals without receipt of at least one indication, of the one or more indications, from the communicating device. In particular embodiments, the method may additionally include generating a degraded trustworthiness score corresponding to the communicating device responsive to revoking the bind between or among the identity verifier and the communicating device. In particular embodiments, in response to detecting that a high-entropy token is currently in use by more than one communicating device, invalidating the high-entropy token. In particular embodiments, the method may additionally include transmitting a one-time password exclusively to a communicating device of the more than one communicating devices. In particular embodiments, the method may additionally include transmitting a previously unused high-entropy token to the communicating device of the more than one communicating devices. In particular embodiments, the method may additionally include accessing a data store including the subscriber identifier and an internet protocol address corresponding to the communicating device. In particular embodiments, the method may additionally include authenticating one or more additional communicating devices via transmitting a one-time password to the one or more additional communicating devices or to the known communicating device. In particular embodiments, the method may additionally include establishing a communications link between the one or more additional communicating devices. The method may also include obtaining the one-time password via the established communication link. In particular embodiments, the method may additionally include transmitting signals representative of one or more additional high-entropy tokens to the one or more additional communicating devices responsive to authenticating, in which the one or more additional communicating devices correspond to devices having a universally unique identifier assigned by the identity verifier.

Another general aspect includes an apparatus having a processor coupled to at least one memory device to obtain, at a communicating device, signals representative of one or more high-entropy tokens transmitted via a communications network, the one or more high-entropy tokens including one or more component tokens. The processor coupled to the at least one memory is additionally to encrypt, utilizing a first encryption key derived from at least one component token of the one or more component tokens, one or more parameters to be transmitted from the communicating device to an identity verifier. The processor coupled to the at least one memory is additionally to transmit, via the communications network, one or more signals representative of the encrypted one or more parameters. The processor coupled to the at least one memory is additionally to obtain, at the communicating device, one or more signals indicating an outcome of a comparison between the encrypted one or more parameters with one or more similar parameters encrypted by the identity verifier.

In particular embodiments, the processor coupled to the at least one memory is additionally to transmit, within a period of no greater than 10 days, one or more indications that at least one component token of the one or more component tokens is to expire within a predetermined time period. In particular embodiments, the processor coupled to the at least one memory device to transmit one or more signals to indicate at least one expiring component token is additionally to transmit a signal representative of a parameter specific to the communicating device. In particular embodiments, the processor coupled to the at least one memory is additionally to generate an additional encryption key based, at least in part, on at least one fresh component token obtained at the communicating device responsive to expiration of at least one component token of the one or more component tokens. In particular embodiments, the processor coupled to the at least one memory is additionally to generate at least one fresh high-entropy token based, at least in part, on the at least one fresh component token.

Another general aspect includes an apparatus to authenticate a communicating device via a communications network, including a processor coupled to at least one memory to recognize, via a subscriber identifier, the communicating device as a known device operating within the communications network. The processor coupled to the at least one memory is additionally to transmit signals representative of one or more high-entropy tokens to the communicating device, the one or more high-entropy tokens including one or more component tokens. The processor coupled to the at least one memory is additionally to obtain one or more encrypted parameters, the one or more encrypted parameters generated utilizing at least one of the one or more component tokens. The processor coupled to the at least one memory is additionally to compare the one or more obtained encrypted parameters with one or more similar parameters encrypted via an identity verifier.

In particular embodiments, the processor coupled to the at least one memory is additionally to receive, within a period of no more than 10 days, one or more indications of at least one expiring component token. In particular embodiments, the processor coupled to the at least one memory is additionally to generate an upgraded trustworthiness score responsive to receipt of the one or more indications. In particular embodiments, the processor coupled to the at least one memory is additionally to responsive to detecting expiration of at least one component token of the one or more component tokens, generate a fresh high-entropy token by appending the at least one fresh component token to a portion of a high-entropy token of the one or more high-entropy tokens. In particular embodiments, the processor coupled to the at least one memory is additionally to revoke a bind between or among the identity verifier and the communicating device responsive to passage of a time period greater a threshold number of days without receipt of one or more indications of at least one expiring token. In particular embodiments, the threshold number of days corresponds to no more than 10 days.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

FIG. 4 shows a communication indicating expiration of a component token followed by transmission of a fresh component token, according to an embodiment.

FIG. 6 is a diagram of communicating devices forming a "persona," in which the persona may be authenticated, according to an embodiment.

FIGS. 7-8 are flowcharts for methods of device authentication via a high-entropy token, according to embodiments.

Figure 1:
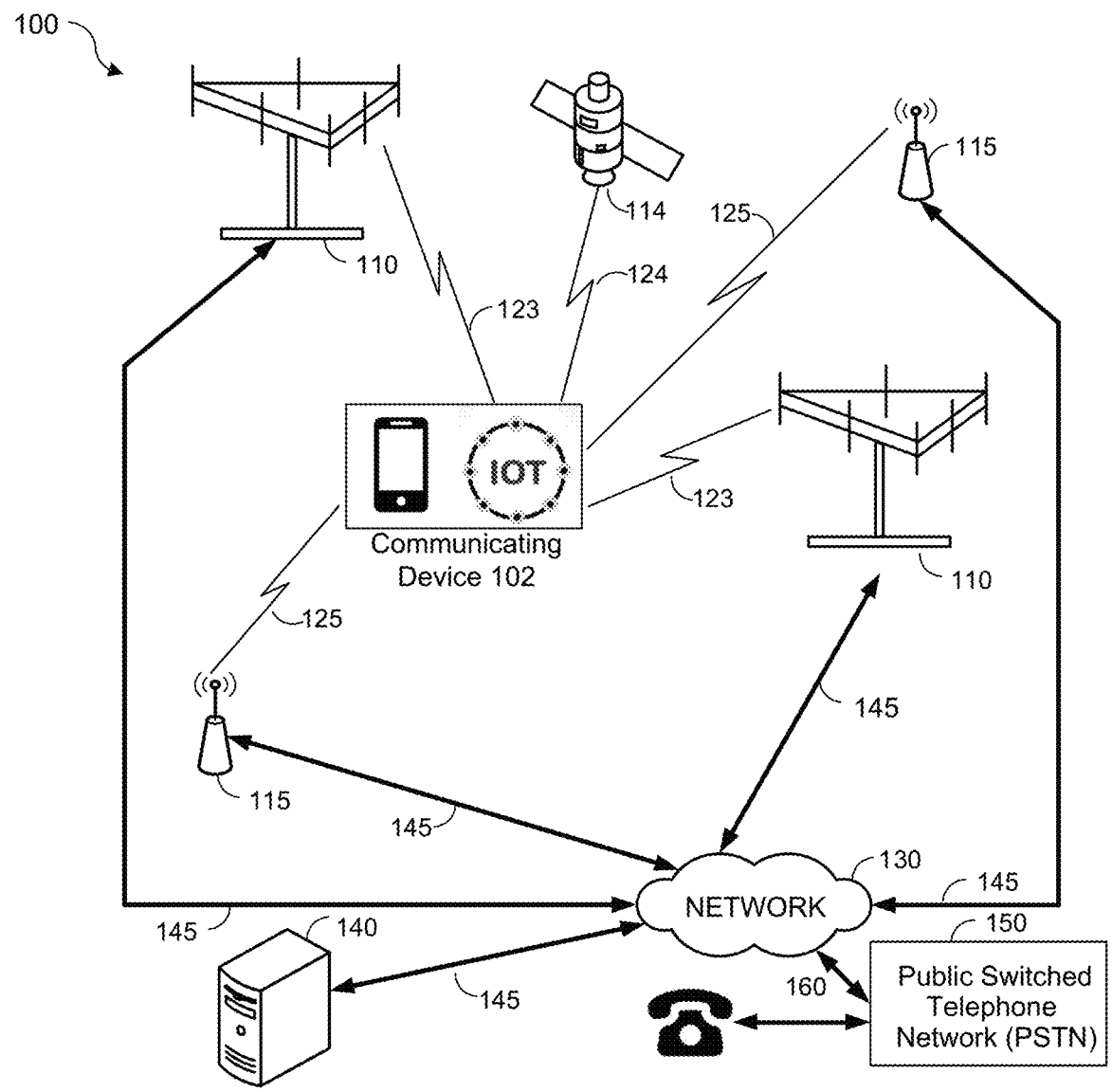
FIG. 1 is a diagram of a communications infrastructure that includes both wireless and wireline communicating devices, according to various embodiments.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases in various places throughout this specification, are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application.

As previously alluded to, devices that communicate electronically, such as wireless mobile communications devices, voice over Internet protocol (VoIP) communicating devices, and devices representing the Internet of things (e.g., wireless sensors, wireless appliances, wireless industrial, commercial, and household machines, etc.) become increasingly popular. As these types of devices gain in popularity, a need to authenticate, verify, and/or validate such electronically communicating devices also increases. Authentication of electronically communicating devices, and/or users of such devices, may be especially beneficial in environments that may facilitate financial transactions utilizing wirelessly communicating devices. Such transactions may involve completing applications for credit, engaging in electronic financial transactions, purchasing products and/or services, obtaining access to privileged content, completing loan applications, completing forms involved with applying for healthcare coverage (such as in connection with visiting a health provider's office), and/or engaging in a number of other types of transactions via a communicating device. In other environments, such as environments involving IOT devices, wirelessly communicating devices may facilitate remote access to a wide variety of sensors, appliances, machines, and instruments, in which output signals from such devices may be utilized to drive numerous decision-making processes. To facilitate transactions involving communicating devices, and/or to obtain signal outputs from trusted communicating IOT devices, a subscriber co-located with, or otherwise affiliated with, a communicating device may establish an identity. An identity may be established in connection with a communicating device subscriber account with a cellular or mobile wireless communications services carrier, a VoIP services provider, or other type of communication services carrier. Establishing an account associated with a communicating device, utilizing, for example, a subscriber account identifier (e.g., a cellular telephone number, a universally unique identifier or UUID, etc.), may permit an individual attempting to engage in an electronic or digital transaction to be authenticated, authorized, and/or verified prior to engaging in the transaction. In other instances, an account associated with a communicating device may operate to provide a measure of confidence or accountability with respect to the integrity of information signals supplied by IOT sensors. In some instances, in view of the nature of electronic or digital transactions, such as in environments in which electronic or digital transactions can be initiated via a communications network at any time and at any location, it may be useful to verify and/or authenticate a communicating device relatively quickly, such as in a real-time fashion, for example.

In a financial services environment, for example, authentication and/or verification of a subscriber operating, or at least co-located with, a communicating device may be desirable in response to a client institution or organization (e.g., a financial institution, a brokerage, a healthcare provider, content provider, etc.) seeking to determine and/or prove identity of the transacting party. In another example, such as in an IOT environment, authentication and/or verification of a communicating device may be desirable as a means of verifying integrity of output signals from IOT devices. Authentication and/or verification of a communicating device may involve establishing a bind between an authenticating entity and a real-world identity of a subscriber operating a communicating device and/or a subscriber associated with one or more IOT devices. In such contexts, a subscriber account identifier, which may exist in a digital domain, may operate to establish a persistent, continuing, and objectively verifiable correspondence or affiliation between a communicating device and a subscriber in possession of, or at least associated with, a particular communicating device. Thus, in a financial services environment, for example, a unique subscriber account identifier may be employed to signify and/or identify a particular transacting party. In this context, the term "mobile communicating device identity" and/or similar terms refer to an identity that leverages a mobile communicating device account relationship of a subscriber as a source of authentication and/or verification of a transacting party. Also in this context, the term "mobile subscriber device account" and/or similar terms refer to a mobile communication services provider account. The terms "mobile communicating device services provider," "mobile communicating device carrier," and "mobile network operator" may be used interchangeably. Furthermore, in this context, the term "mobile device services carrier," "communication services carrier," "services carrier," or simply "carrier" may refer to an entity operating within a communications infrastructure to provide wired and/or wireless communication services to the public for a consideration, such as a monthly subscription fee.

In the context of the present disclosure, a "communication services carrier" may refer to a mobile communication services provider and/or mobile network operator. However, there are examples of carriers that do not correspond to mobile communicating device services providers and/or mobile network operators. Such instances may include wireline services providers (for example, providers of services operating within the public switched telephone network or PSTN), which include wireline services for rotary-dial telephones and/or telephones utilizing, for example, dual tone multi-frequency (DTMF) signaling. Accordingly, the terms "services carrier" or simply "carrier" may be used in place of a communication services provider and/or wireline telephone services provider without a loss in meaning and/or understanding. In a given situation, particular context of usage should indicate if a term is being used in a general sense or in a narrower sense, such as referring to a mobile communicating device services provider, wireline services provider, mobile paging services provider, and/or mobile network operator, for example.

Other aspects of verifying and/or authenticating a communicating device (e.g., a mobile communications device, an IOT device, etc.) are also described in greater detail hereinbelow. For example, in an embodiment, verifying the identity and/or authenticating a subscriber or an owner of an IOT device, may bring about establishment of a bind between an individual and a mobile subscriber account. Further, a mobile subscriber account is merely an example approach toward establishing a correspondence between an individual and a communicating device, and claimed subject matter is not intended to be limited to accounts established for mobile cellular communications devices and IOT devices. Rather, the term "account" or "subscriber account" in this context refers generally to a formal business arrangement between a provider of the account and an entity, a person, or other party seeking to obtain privileges associated with the account. Thus, the term "account" is intended to be broadly interpreted as an arrangement that may provide certain privileges. In this context, privileges may involve access to credit (e.g., so as to facilitate the present or future purchase of goods or services), access to privileged content (e.g., such as premium sports, cinema, or other entertainment content), access to health records, access to financial records, access to financial and/or brokerage accounts, access to parameters transmitted by IOT devices, an ability to control operation of IOT devices, and so forth. In this context, the term "privileged content" is intended to be interpreted broadly so as to encompass any type of content available exclusively to certain individuals and/or certain entities in response to supplying certain credentials to a bank or financial institution, an IOT device, a mobile communication services provider, and so forth.

Likewise, an account may comprise various attributes. For example, in the context of a mobile cellular communications device (e.g., a mobile telephone), the term "subscriber account identifier" refers to a unique descriptor or feature associated with the account that defines certain aspects of the account. For example, in nonlimiting illustrations, a subscriber account identifier may refer to (or may at least be associated with) a mobile telephone number, a mobile subscriber unique alias, an International Mobile Subscriber Identifier (IMSI), Integrated Circuit Card Identifier (ICC ID), a mobile services and/or other type of identifier (e.g., a unique identifier) employed in connection with the particular mobile network operator or the mobile communication services provider. Mobile communications networks may include those compatible or compliant with a Global System for Mobile Communications (GSM) network, for example. Other examples of mobile subscriber account identifiers may include an International Mobile Equipment Identifier (IMEI), Mobile Station International Subscriber Directory Number (MSISDN), an international mobile subscriber identifier (IMSI), or any other identifier that may be utilized to identify a mobile billing account number/identifier. In the context of an IOT device, a combination of alphanumeric characters (which may function as a subscriber account identifier) may identify an individual authorized to receive or access parameters transmitted from the IOT device. The same or a different combination of alphanumeric characters may identify an individual authorized to modify/influence parameter settings of an IOT device.

As discussed herein, in a financial services environment, a subscriber associated or affiliated with a communicating device may apply for an account, such as a credit account, for example, or may apply for any other type of account that imparts or confers particular privileges on the subscriber co-located or in possession of the communicating device. In other instances, a subscriber co-located with a mobile device may attempt to engage in a financial transaction, for example, or may attempt to access privileged information/privileged content, just to name a few examples. In still other instances, a subscriber may wish to obtain output parameters from an IOT device. In these and other instances, to obtain privilege, such as access to credit, access to privileged information (e.g., premium content streaming or other entertainment), to access output parameters from an IOT device, a mobile subscriber may be required to establish some type of credentials, such as via completion of an application (e.g., such as an application for an account), an application for credit, an application for an increase in credit, or may be required to make another type of formal request, which involves the subscriber supplying subscriber-specific parameters. However, as previously alluded to, it may be advantageous for the subscriber, and for the institution or service providing privileges to the subscriber, for example, to verify or prove that, indeed, the subscriber is co-located with, or otherwise affiliated with, a particular communicating device. By proving affiliation with a particular communicating device, an institution or a service may reduce the risk of an unscrupulous individual, for example, accessing privileged information, which may permit the unscrupulous individual to penetrate an IOT network or to impersonate a particular individual. Such fraudulent behavior may be made possible by an unscrupulous individual stealing another subscriber's mobile phone or identity, or by way of obtaining sensitive information that permits the unscrupulous individual to impersonate another subscriber. In certain instances, impersonation of another subscriber may permit the unscrupulous individual to withdraw funds from a subscriber's account, illegally obtain physical access to a subscriber's home (e.g., such as by unlocking a door controlled by an IOT device), and so forth.

Thus, in particular embodiments, authenticating a particular communicating device may permit an authenticating entity to prove that a verified and/or authenticated individual is attempting to engage in a transaction, attempting to access parameters from an IOT sensor, attempting to modify operation of an IOT device, or the like. Obtaining such proof may reduce the likelihood of an unscrupulous individual completing a fraudulent transaction, such as a transaction that involves a credit application, an increase in a credit line, a purchase, an asset sale, access to premium content, access to a subscriber's home or office, or to obtain any other type of privileges via fraud and/or deception.

Accordingly, in particular embodiments, to reduce possibilities of fraudulent access of a communicating device by an unscrupulous individual, for example, an identity verifier may transmit a token, which may comprise a combination of alphanumeric characters, for example, to a communicating device. The communicating device may utilize the token to encrypt communications between the communicating device and the identity verifier, which may permit the communicating device to securely transfer authenticating parameters to and from the identity verifier. In some instances, the token may be utilized to transfer an encryption parameter or key (e.g., a nonce) from an identity verifier to a communicating device and/or from a communicating device to an identity verifier. Such encryption may bring about trusted, secure communications of authentication parameters between the identity verifier and the device. However, it may be appreciated that in response to such a token being intercepted, copied, or generated independently, for example, by an unscrupulous individual, the security of communications between a communicating device and an identity verifier, for example, may be compromised.

Accordingly, in particular embodiments, to further reduce possibilities of fraudulent use of a communicating device by an unscrupulous individual, a token transferred between an identity verifier and a communicating device may be enhanced so as to form a high-entropy token. In this context, a high-entropy token refers to a sequence of alphanumeric characters, hexadecimal characters, or any other type of characters that are subject to random change over time. For example, a high-entropy token may comprise one or more component tokens after a period of time has elapsed, an identity verifier may transmit a new or "fresh" (i.e., unique and/or previously unused) component token, which can be appended to a chain of component tokens that form a high-entropy token. Thus, in this context, a "fresh" component token refers to a sequence of alphanumeric, hexadecimal, octal, or any other type of character string generated, perhaps utilizing a random character generator, that has not been previously utilized. In particular embodiments, a fresh component token may be transmitted, via a communications network, to a communicating device responsive to determining that a component token, of the one or more component tokens, is scheduled to expire within a predetermined time period. In response to obtaining a fresh component token, the communicating device may append the fresh component token to an existing high-entropy token, thereby forming a fresh high-entropy token. The expired (or soon-to-expire) component token may be unlinked from the high-entropy token and discarded. In particular embodiments, a predetermined time period corresponds to between 5 minutes and 1 day. However, in certain embodiments, a predetermined time period may represent the time period, such as 5 minutes, 10 minutes, 30 minutes, 60 minutes, 120 minutes, 1 day, and claimed subject matter is not limited in this respect.

In particular embodiments, fresh component tokens may be transmitted to a communicating device in response to the communicating device performing a periodic registration or check-in process. An interval between registration or check-in processes may be selected in accordance with a need to frequently obtain fresh component tokens, which may be utilized to generate an encryption key for use by the communicating device, without unduly burdening an identity verifier. In particular embodiments, a registration or check-in process may be initiated by a communicating device at intervals of between 1 and 10 days, at intervals of no more than 10 days, at intervals of no more than two weeks, and so forth, and claimed subject matter is not limited in this respect. In addition, responsive to a communicating device failing to periodically register and/or execute a check-in process, an identity verifier, for example, may determine that the communicating device is potentially untrustworthy. Failure of the communicating device to check-in or register after passage of a threshold number of intervals, such as, for example, within a threshold number of 1-hour intervals, within a threshold number of 1-day intervals, within a threshold number of 1-week intervals, within a threshold number of 1-day to 10-day intervals, within a threshold number of intervals of no more than 10 days, within a threshold number of 2-week intervals, or within any other threshold number of intervals, may invalidate and/or revoke a bind between an identity verifier and a communicating device. Responsive to revocation of a bind, an identity verifier, for example, may revise (e.g., reduce or degrade) a confidence metric (e.g., a trustworthiness score) associated with the communicating device.

On the other hand, in response to a communicating device performing regular check-ins and/or registrations within predetermined intervals, such as, for example, within a 1-hour interval, within a 1-day interval, within a 1-week interval, between an interval of 1 day to 10 days, within an interval of no more than 10 days, within a 2-week period, between 10 days and 30 days, or within any other interval, such periodic or occasional contact may enhance trustworthiness or other type of confidence metric. In such instances, regular or periodic check-ins and/or registrations may operate as an input signal to a process for assessing risk events with respect to a communicating device. Thus, in addition to factors such as a relatively long tenure of a communicating device, the infrequent number porting of a communicating device, the infrequent removal/replacement of a SIM of a communicating device, infrequent password resets, such regular or periodic check-ins may operate to enhance and/or upgrade trustworthiness with respect to a communicating device.

In certain embodiments, one or more high-entropy tokens may be transmitted from an identity verifier, for example, in response to transmission of a one-time password from the identity verifier to a communicating device. A one-time password may be transmitted utilizing a uniform resource locator (URL), which may operate to direct a communicating device to a website under the control of an identity verifier. Responsive to a communicating device establishing a connection with an identity verifier, the identity verifier may establish a browser session with the communicating device. During a browser session, a communicating device may upload identity parameters of the device, which, in response, may give rise to an identity verifier downloading a high-entropy token to a communicating device. Following termination of a browser session between a communicating device and an identity verifier, the communicating device and the identity verifier may exchange authentication parameters encrypted via one or more component tokens of a high-entropy token.

An identity verifier may utilize parameters specific to a particular communicating device, stored in protected (e.g., secure) memory locations accessible to a processor of the device, to bring about a comparison of the device-specific parameters with corresponding parameters stored in a data store accessible to the identity verifier. In some embodiments, parameters specific to a particular communicating device, along with one or more tokens issued to the particular communicating device, are compared with corresponding tokens and identifiers stored by an identity verifier to determine if a match exists. Responsive to agreement or a match between parameters from the communicating device and parameters obtained from the data store, the identity verifier may be capable of proving the identity of and/or authenticate the subscriber operating, or associated with, the particular communicating device. Conversely, responsive to the identity verifier being unable to match the device-specific parameters with corresponding parameters stored in a data store, an identity verifier may return an indication of an inability to match the stored parameters with the device parameters.

In particular embodiments, proving the authenticity of a subscriber associated with the communicating device may operate to form a bind between the communicating device and the identity verifier. Thus, in response to the communicating device subsequently contacting the identity verifier, the identity verifier may determine that the communicating device is a known, recognized, and/or previously authenticated device. Thus, in this context, "recognizing" a communications device refers to an identity verifier, for example, determining that an identifier, such as a mobile telephone number, IMSI, MSISDN, IMEI, ICC ID, mobile subscriber unique alias (e.g. a UUID), or any other descriptor that corresponds to a communicating device for which deterministic, historical and/or behavioral parameters, with respect to the device, are known by (or accessible to) the identity verifier.

In particular embodiments, after forming a bind between a communicating device and an identity verifier, the identity verifier may issue one or more high-entropy tokens to the communicating device, which may be uploaded to memory under the control of an operating system of the communications device. The one or more high-entropy tokens permits communications between the identity verifier and the communications device to be encrypted in accordance with one or more encryption techniques. Thus, at least in particular embodiments, an identity verifier may operate, at least to some extent, as a virtual network operator (e.g., a mobile virtual network operator). It should be noted, however, that although an identity verifier may issue one or more high-entropy tokens to a communicating device, such issuance of high-entropy tokens may not, at least in particular embodiments, bring about a change in the communication services carrier providing services to the device. Accordingly, at least in some instances, inbound and outbound call processing, inbound and outbound text message processing, billing, and other services may remain with an existing communication services carrier. Thus, at least in particular embodiments, an identity verifier may operate to establish a relationship or correspondence between a subscriber identifier, such as a mobile telephone number, and the identity verifier.

Thus, in particular embodiments, use of high-entropy tokens brings about a capability for conducting secure, encrypted transmissions between a communicating device and an identity verifier. In some instances, a significant portion, or even all, communications between a communicating device and an identity verifier may be conducted using an encryption key generated via one or more component tokens of a high-entropy token. Further, responsive to the occasionally- or periodically-changing nature of the high-entropy tokens, replication of tokens, such as by an unscrupulous individual, may be difficult to achieve. Further, in response to an identity verifier detecting that a high-entropy token is currently in use by more than one communicating device, the identity verifier may invalidate or revoke the high-entropy token. It should be noted that an identity verifier, for example, may invalidate and/or revoke high-entropy tokens for a variety of other reasons, and claimed subject matter is not limited in this respect.

In particular embodiments, responsive to invalidation or revocation of a high-entropy token, an identity verifier may transmit (e.g., immediately transmit) a one-time password, such as in the form of a URL, to a communicating device so that an additional, previously-unused high-entropy token can be conveyed to the device. In particular other embodiments, responsive to invalidation or revocation of a high-entropy token, an identity verifier may perform a "silent authentication," in which an Internet protocol address of a communicating device is utilized to ascertain a legitimate communicating device as opposed to a communicating device potentially being utilized for fraudulent purposes. In such instances, a silent authentication may involve a communication services carrier accessing a data store comprising a mapping between an Internet protocol address and one or more communicating device-specific parameters such as a subscriber account identifier (e.g., a mobile telephone number) a MSISDN, and IMEI, an IMSI, a UUID, or the like, and claimed subject matter is not limited in this respect. In particular other embodiments, responsive to invalidation or revocation of a high-entropy token, an identity verifier may authenticate a communicating device by transmitting an image, such as a QR code, to a communicating device.

In this context, "invalidating" the high-entropy token, or any component thereof, of a communicating device refers to digitally setting a variable associated with the unique alias to indicate that the unique alias is invalid. Accordingly, responsive to determining whether the unique alias is valid, a variable may be returned to the identity verifier, which, in turn, may interpret whether the variable is set to 'true' or 'false.' For example, if a variable called 'IsValid' is set to false, then an identity verifier may ascertain that the high-entropy token, or component token, has been invalidated. Upon invalidating the high-entropy token, for example, the communicating device may undergo re-binding to an identity verifier prior to issuing a new (e.g., previously unused), one or more. Invalidating events may include but are not limited to a communicating device having not exchanged one or more high entropy tokens within a threshold number of consecutive intervals (e.g., within a threshold number of consecutive 1-hour intervals, within a threshold number of consecutive of 1-day intervals, within a threshold number of consecutive 1-week intervals, within a threshold number of consecutive intervals of between 1 day and 10 days, within a threshold number of consecutive 10-day intervals, within a threshold number of consecutive 2-week intervals, and so forth), during which the communicating device has been uncoupled from the Internet, inactivated, or otherwise idle; the identity verifier receiving more than one response to the same authentication request or replacement request; failing to recognize the communications device; and/or discovering one or more risk events or other indications of potential fraud that are sufficiently frequent or severe.

Thus, in particular embodiments, use of high-entropy tokens by a communicating device may allow financial institutions, for example, to be assured that an unscrupulous individual, who might attempt to impersonate a particular subscriber, for example, cannot complete a financial transaction. In other embodiments, use of high-entropy tokens by a communicating device may ensure that unscrupulous and/or unauthorized individuals do not have access to output parameters from IOT sensors. Further, high-entropy tokens may ensure that such individuals cannot interact with IOT devices, such as to modify settings of IOT devices, terminate operation of IOT devices, and so forth. In some instances, such as those in which the communicating device corresponds to a mobile or cellular communications device, verification and/or authentication of the communications device may permit the identity verifier to access a data store so as to determine a reputation with respect to the communications device. In particular embodiments, a reputation with respect to a communications device may be negatively impacted (e.g., degraded) responsive to the communications device being associated with one or more risk events. Such risk events may include, but are not limited to, recent porting of a subscriber account identifier (e.g., a telephone number) associated with a communications device, recent replacement of a communications device, a recent request of a one-time-password associated with a communications device, removal/replacement of a SIM of a communications device, recent revocation and/or invalidation of a high-entropy token, as well as any number of additional risk events associated with the device. In particular embodiments, a reputation of a communicating device may be positively impacted (e.g., enhanced) responsive to the device having never been ported (or having not been ported for a prolonged period of time), having never undergone removal/replacement of a SIM (or having not undergone such removal/replacement of a SIM for a prolonged period of time), and so forth. It should be noted that claimed subject matter is intended to embrace risk events with respect to a communications other than these, virtually without limitation.

Although the discussion that follows relates to any type of account, in nonlimiting illustrations, accounts corresponding to communicating devices may be used for illustration. However, it is understood that claimed subject matter is intended to not be limited to examples provided primarily for purposes of illustration, since such examples may be oversimplified for purposes of comprehension, for example.

In FIG. 1, corresponding to embodiment 100, communicating device 102 corresponds to a device designed primarily to conduct communications via wireless or wireline means, such as to provide mobile wireless telephone communications, texting, web browsing, and so forth. Communicating device 102 may additionally correspond to an IOT device, which may comprise any of a wide variety of devices, such as home automation devices (e.g., garage door openers, door locks, thermostats, etc.), Wireless Fidelity (Wi-Fi) enabled large appliances (e.g., washing machines, dryers, refrigerators, etc.), entertainment systems and components (e.g., televisions, stereos, etc.), wearable devices (e.g., smart watches, wearable insulin pumps, etc.), control devices (e.g., air conditioners, heaters, etc.), moisture sensors, humidity sensors, and a myriad of other control devices, sensing devices, monitoring devices, and claimed subject matter is not limited in this respect.

In the embodiment of FIG. 1, communicating device 102 may transmit radio signals to, and receive radio signals from, a wireless communications network. In an example, communicating device 102 may communicate with a cellular communications network by transmitting wireless signals to, and/or receiving wireless signals from, a cellular transceiver 110, which may comprise a wireless base transceiver subsystem, a Node B or an evolved NodeB (eNodeB), over wireless communication link 123. Similarly, communicating device 102 may transmit wireless signals to, and/or receive wireless signals from, local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a mobile device over a wireless link, and claimed subject matter is not limited in this respect. In particular embodiments, cellular transceiver 110, local transceiver 115, satellite 114, and PSTN 150 represent touchpoints, which permit communicating device 102 to interact with network 130.

Examples of network technologies that may support wireless communication link 123 are GSM, Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). In the embodiment of FIG. 1, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, BT and LTE.

In a particular implementation, cellular transceiver 110 and local transceiver 115 may communicate with server 140, such as by way of network 130 via communication links 145. Here, network 130 may comprise any combination of wired or wireless links and may include cellular transceiver 110 and/or local transceiver 115 and/or server 140. In a particular implementation, network 130 may comprise Internet Protocol (IP) or other infrastructure capable of facilitating communication between communicating device 102 at a call source and server 140 through local transceiver 115 or cellular transceiver 110. In an embodiment, network 130 may also facilitate communication between communicating device 102, server 140 and a PSTN 150, for example through communications link 160. In another implementation, network 130 may comprise a cellular communication network infrastructure such as, for example, a base station controller or packet based or circuit based switching center (not shown) to facilitate mobile cellular communication with communicating device 102. In a particular implementation, network 130 may comprise local area network (LAN) elements such as WiFi APs, routers and bridges and may, in such an instance, comprise links to gateway elements that provide access to wide area networks such as the Internet. In other implementations, network 130 may comprise a LAN and may or may not involve access to a wide area network but may not provide any such access (if supported) to communicating device 102. In some implementations, network 130 may comprise multiple networks (e.g., one or more wireless networks and/or the Internet). In one implementation, network 130 may include one or more serving gateways or Packet Data Network gateways. In addition, one or more of server 140 may comprise an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 130.

In particular embodiments, communications between communicating device 102 and cellular transceiver 110, satellite 114, local transceiver 115, and so forth may occur utilizing signals communicated across wireless communications channels. Accordingly, the term "signal" may refer to communications utilizing propagation of electromagnetic waves across wireless communications channels. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in one or more signals using one or more of the above-identified modulation techniques.

In particular implementations, and as discussed below, communicating device 102 may comprise circuitry and processing resources capable of obtaining location related measurements (e.g. for signals received from GPS or other Satellite Positioning System (SPS) satellites 114), cellular transceiver 110 or local transceiver 115 and possibly computing a position fix or estimated location of communicating device 102 based on these location related measurements. In some implementations, location related measurements obtained by communicating device 102 may be transferred to a location server such as an enhanced serving mobile location center (E-SMLC) or SUPL location platform (SLP) (e.g. which may comprise a server, such as server 140) after which the location server may estimate or determine an estimated location for communicating device 102 based on the measurements. In the presently illustrated example, location related measurements obtained by communicating device 102 may include measurements of signals 124 received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110).

Communicating device 102 or a separate location server may obtain a location estimate for communicating device 102 based on location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at communicating device 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at communicating device 102. Here, server 140 may be capable of providing positioning assistance data to communicating device 102 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, communicating device 102 may obtain measurements of signal strengths for signals received from cellular transceiver 110 and/or local transceiver 115 and/or may obtain a round trip signal propagation time (RTT) between communicating device 102 and a cellular transceiver 110 or local transceiver 115. A communicating device 102 may use these measurements together with assistance data (e.g. terrestrial almanac data or GNSS satellite data such as GNSS Almanac and/or GNSS Ephemeris information) received from server 140 to determine a location estimate for communicating device 102 or may transfer the measurements to server 140 to perform the same determination. A call from communicating device 102 may be routed, based on the location of communicating device 102, and connected to PSTN 150, for example, via wireless communication link 123 and communications link 160.

A mobile device at a call source (e.g., communicating device 102 of FIG. 1) may be referred to by any name corresponding to a cellphone, smartphone, laptop, tablet, PDA, tracking device or some other portable or movable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., communicating device 102) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level).

Responsive to communicating device 102 comprising a mobile cellular communications device, device 102 may comprise an embedded sensor suite which may, for example, include inertial sensors and environment sensors. Inertial sensors of communicating device 102 may comprise, for example accelerometers (e.g., collectively responding to acceleration of communicating device 102 in and x-direction, a y-direction, and a z-direction). Communicating device 102 may further include one or more gyroscopes or one or more magnetometers (e.g., to support one or more compass applications). Environment sensors of communicating device 102 may comprise, for example, temperature sensors, barometric pressure sensors, ambient light sensors, camera imagers, microphones, just to name few examples. Sensors of communicating device 102 may generate analog or digital signals that may be stored in utilizing one or more memory locations internal to device 102 in support of one or more applications such as, for example, applications collecting or obtaining biometric attributes of a user (e.g., a subscriber) of communicating device 102.

The architecture of the cellular communications network described in relation to FIG. 1 may comprise a generic architecture that is capable of accommodating a variety of outdoor and indoor location solutions including the standard SUPL user plane location solution defined by the Open Mobile Alliance (OMA) and standard control plane location solutions defined by 3GPP and 3GPP2. For example, server 140 may function as (i) a SUPL location platform to support the SUPL location solution, (ii) an E-SMLC to support the 3GPP control plane location solution with LTE access on wireless communication link 123 or 125, or (iii) a Standalone Serving Mobile Location Center (SAS) to support the 3GPP Control Plane Location solution for UMTS.

Figure 2:
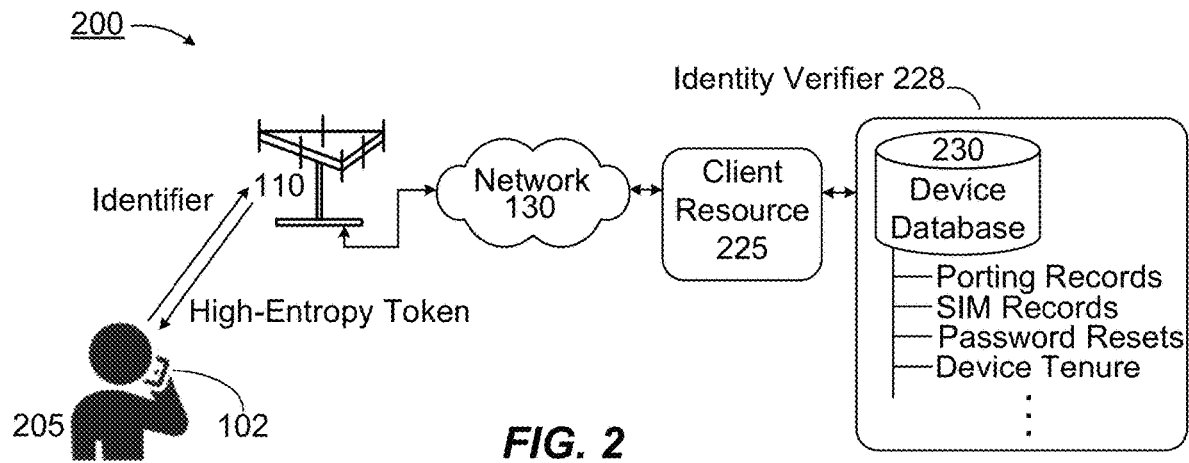
FIG. 2 is a diagram of a subscriber in possession of a communicating device to permit interaction with a client server and an authentication server, according to an embodiment.

In view of the communications infrastructure shown and described in reference to FIG. 1, more particular embodiments directed toward authenticating a communicating device via a high-entropy token are discussed hereinbelow. Thus, in embodiment 200, as depicted in FIG. 2, shows a subscriber in possession of communicating device 102, which may correspond to a mobile cellular communications device. Communicating device 102 may interact with client computing resource 225 and identity verifier 228. In the embodiment of FIG. 2, mobile subscriber 205 and/or communicating device 102 may be located at any point within communications range of cellular transceiver 110. As shown in FIG. 2, communicating device 102 may communicate with client computing resource 225 via network 130 utilizing a wireless communications channel between the communicating device and cellular transceiver 110. It should be noted, however, that claimed subject matter is not limited exclusively to wireless communications between communicating device 102 and cellular transceiver 110. For example, in particular embodiments, communicating device 102 may communicate with client computing resource 225 by way of one or more intervening Wi-Fi networks or by way of wireline telephone services (e.g., the public switched telephone network).

Subscriber 205, utilizing communicating device 102, may attempt to engage in a financial transaction via client computing resource 225. Client computing resource 225 may represent or signify a bank (or other type of financial institution), a real estate title company, a healthcare provider, a content provider, or any other type of entity that may, at least from time to time, require verification, authentication, and/or auditing of communications device 102 prior to permitting a transaction to take place. In an alternative embodiment, communicating device 102 may represent an IOT device, which may operate to transmit output signals representing, for example, sensor measurements, which may be utilized by a client computing resource, which may facilitate decision-making processes other than those of a financial nature, such as to support processes involving, for example, other types of IOT devices.

Subscriber 205 may operate communicating device 102 to initiate a transaction involving client computing resource 225. In response to subscriber 205 attempting to engage in a financial transaction, client computing resource 225 may communicate with identity verifier 228, which may operate to authenticate, verify, and/or audit subscriber 205 operating communications device 102. In the embodiment of FIG. 2, authentication, verification, and/or auditing of subscriber 205 may include identity verifier 228 accessing device database 230, which may include historical records of deterministic events with respect to communicating device 102. Such records may represent events that may be regarded by client computing resource 225 as representing particular levels of trustworthiness of subscriber 205. In particular embodiments, client computing resource 225 may assess trustworthiness of subscriber 205 via examining porting records, which may relate to how often subscriber 205 has ported communications device 102, such as to obtain a new subscriber identifier (e.g., mobile telephone number). Client computing resource 225 may assess trustworthiness of subscriber 205 via examining records related to whether subscriber 205 has recently removed/replaced a SIM or eSIM of a communications device. Client computing resource 225 may assess trustworthiness of subscriber 205 via examining occurrences of password resets, such as indicated via transmission of one-time passwords to communications device 102. Client computing resource 225 may assess trustworthiness of subscriber 205 via examining tenure of communications device 102, which may relate to a duration that subscriber 205 has owned, operated, or has otherwise been affiliated with device 102. It should be noted that claimed subject matter is intended to embrace additional contributors to a trustworthiness score or trustworthiness measure, virtually without limitation.

In the embodiment of FIG. 2, prior to permitting subscriber 205 to engage in a financial transaction via client computing resource 225, identity verifier 228 may establish or form a secure channel between itself and communicating device 102. Thus, as previously alluded to, identity verifier 228 may initiate a browser-based Internet session between the identity verifier and the communicating device. Thus, in particular embodiments, in response to communicating device 102 transmitting a subscriber identifier, which may comprise, for example, a mobile telephone number, identity verifier 228 may generate and transmit a tailored resource locator (e.g., a specially formulated URL), which may be conveyed to communications device 102 via client computing resource 225, network 130, and cellular transceiver 110. In response to obtaining the URL generated by identity verifier 228, communicating device 102 may be directed to initiate a browser-based Internet session directly with identity verifier 228. Although not explicitly depicted in FIG. 2, during a browser-based Internet session, identity verifier 228 may issue a high-entropy token (described in greater detail in reference to FIGS. 3A and 3B) to communicating device 102. In response to obtaining a high-entropy token from identity verifier 228, communicating device 102 may utilize the high-entropy token to generate an encryption key. The generated encryption key may then be utilized by communicating device 102 to permit secure communications between or among communicating device 102 and identity verifier 228. Further, formation of a secure channel between communicating device 102 and identity verifier 228 may occur without bringing about a change in the communication services carrier providing services to device 102. Accordingly, at least in some instances, an existing communication services carrier may continue to process inbound and outbound telephone calls, inbound and outbound text messages, streaming video services, and so forth.

In particular embodiments, communicating device 102 may, from time to time (e.g., regularly, periodically, or responsive to receipt of a prompt from identity verifier 228), initiate brief contact with identity verifier 228, via cellular transceiver 110 and network 130. Contact with identity verifier 228 may permit the identity verifier to issue one or more fresh component tokens to communicating device 102. Device 102 may utilize the one or more fresh component token to update and/or modify encryption parameters utilize to communicate with identity verifier 228. Thus, device 102 may be capable of maintaining a secure channel with an identity verifier, a client computing resource, or other computing entities, and claimed subject matter is not limited in this respect.

It may be appreciated that use of a high-entropy token may provide a capability to encrypt communications between a wide variety of communicating devices, such as mobile cellular communications devices and IOT devices. For example, responsive to communicating device 102 operating as an IOT device, which may not be provisioned with a SIM or an eSIM, the communicating device may be capable of generating an encryption key for communicating with, for example, other computing entities. For example, responsive to communicating device 102 embodying an IOT sensor device capable of executing an Internet browser-based session, device 102 may be capable of conducting secure communications with a client computing resource. Thus, communicating device 102 may securely transmit output data parameters to a client computing resource. In addition, communicating device 102 a be capable of securely control parameters, configuration settings, and so forth from a client computing resource. Further, via use of a high-entropy token, such communications may remain secure so long as communicating device 102 periodically (or at least occasionally) initiates brief contact with an identity verifier to obtain updates, such as fresh component tokens, from the identity verifier.

Figure 3A:
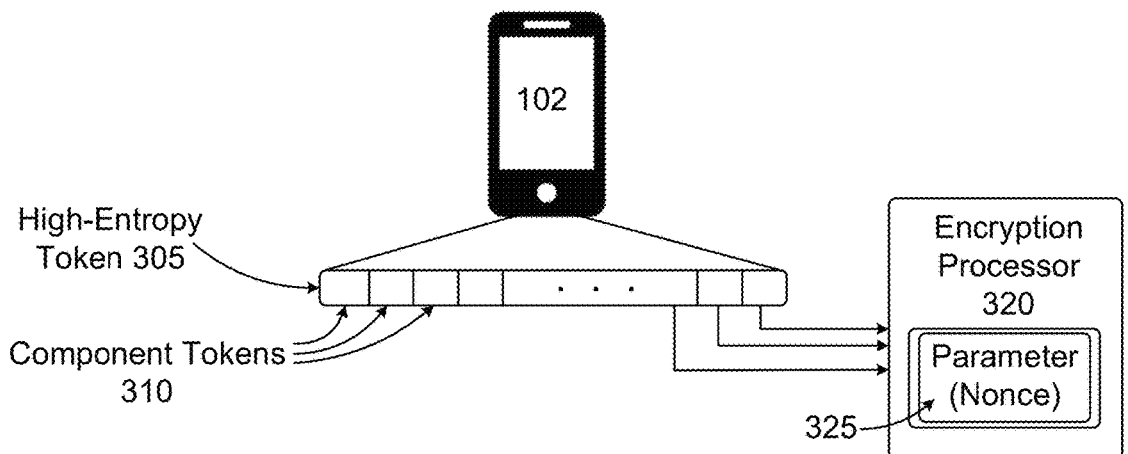
FIGS. 3A-3C are diagrams of high-entropy tokens utilized by a communicating device, according to an embodiment.
Figure 3B:
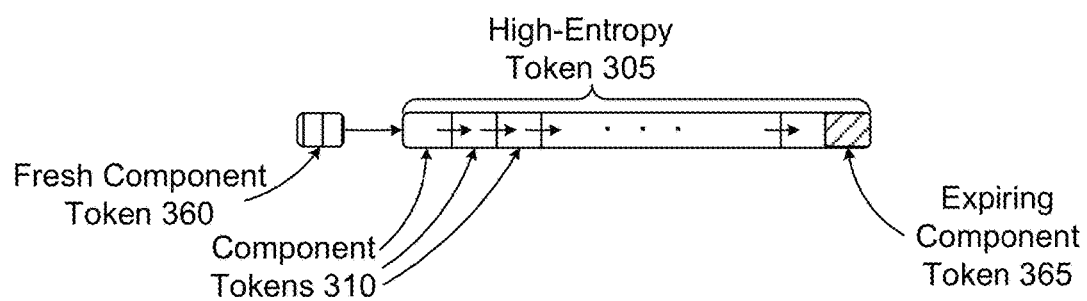
Figure 3C:
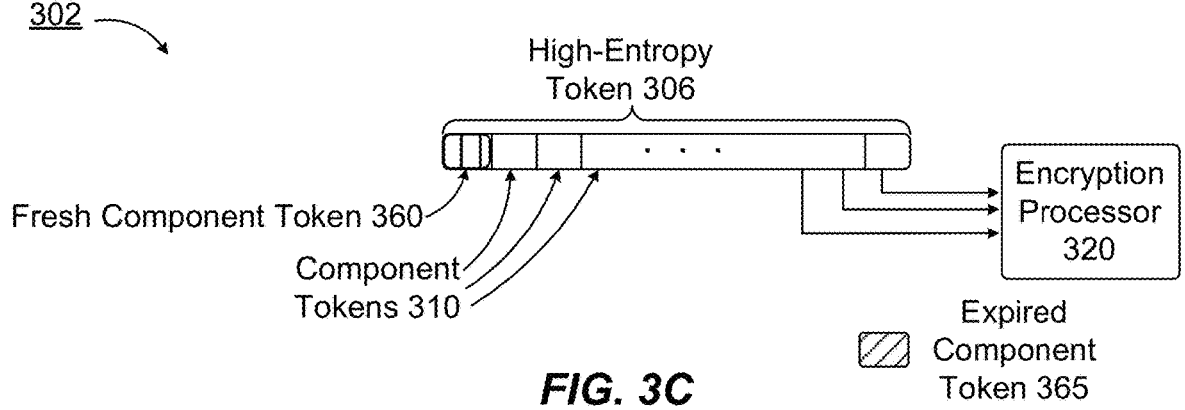

FIGS. 3A-3C are diagrams of high-entropy tokens utilized by a communicating device, according to an embodiment. In the embodiment 300 of FIG. 3, in response to obtaining a high-entropy token from an identity verifier, such as identity verifier 228 of FIG. 2, communicating device 102 may encrypt communications of authentication parameters exchanged between device 102 and the identity verifier. In particular embodiments, communicating device 102 may utilize parameters of a high-entropy token to form a large byte array comprising, for example, hundreds of bytes, thousands of bytes, or an even greater number of bytes. In particular embodiments, the large byte array may be used to generate a polynomial that forms a seed of an encryption algorithm. Accordingly, as shown in FIG. 3A, high-entropy token 305, which comprises component tokens 310, may be utilized to form an input signal to encryption processor 320. Responsive to configuring encryption processor 320, communicating device 102 may encrypt any outgoing authentication parameters, such as nonce 325, as well as decrypting incoming authentication parameters, thereby giving rise to secure, encrypted communication of authentication parameters exchanged between device 102 and, for example, identity verifier 228. In particular embodiments, authentication parameters, such as nonce 325, may be accompanied by a communicating device-specific parameter, such as a UUID, a subscriber account identifier (e.g., a mobile telephone number), an IMEI, a MSISDN, an IMSI, or an ICC ID, for example. Device-specific parameters may serve to notify an identity verifier of the specific communicating device attempting, for example, to obtain authentication via the identity verifier.

As depicted in embodiment 301 depicted in FIG. 3B, a component token of high-entropy token 305 may, in accordance with a predetermined time-to-live, be identified as being scheduled to expire within a predetermined time period. For example, a processor of communicating device 102 may determine that expiring token 365, having a predetermined time-to-live, is scheduled to expire within a predetermined time period of, for example, 5 seconds, 10 seconds, 1 minute, 10 minutes, 1 hour, 1 day, or within some other predetermined time-to-live period. Responsive to detecting an approaching (or imminent) expiration of token 365, communicating device 102 may report, such as to identity verifier 228 of FIG. 2, the upcoming expiration of token 365. Responsive to determination of the expiration of component token 365, an identity verifier may respond by transmitting fresh component token 360 to communicating device 102. Following receipt of fresh component token 360, communicating device 102 may append (or prepend) fresh component token 360 to high-entropy token 305, thereby generating a fresh high-entropy token. Further, component tokens 310 may be shifted, such as in the right-hand direction as shown in FIG. 3B. Expiring component token 365 may then be unlinked from high-entropy token 305 and discarded, such as shown in FIG. 3C, which corresponds to embodiment 302. High-entropy token 306 may then be formed in response to discarding of expired component token 365 and in response to appending fresh component token 360 to remaining component tokens of high-entropy token 305. The process depicted in FIGS. 3B/3C may then be repeated after a predetermined interval, such as prior, or immediately prior to the expiration of a second component token.

Responsive to the appending or prepending of fresh component token 360 to high-entropy token 305, a processor of communicating device 102 may form a second large byte array. The second large byte array may then be utilized to form a second polynomial, which may, in turn, be utilized to form a second encryption seed. The second encryption seed may be utilized by encryption processor 320 to encrypt outgoing transmissions related to authentication of communicating device 102 and to decrypt incoming transmissions from, for example, an identity verifier. Accordingly, a communications channel formed to facilitate an authentication process, such as between communicating device 102 and, for example, an identity verifier, may remain encrypted before expiration of expiring component token 365 as well as after expiration of expiring component token 365. Thus, at least in some embodiments, parameters related to the authentication of communicating device 102 remain encrypted and secure at all times.

As previously alluded to, in particular embodiments, a communicating device may occasionally or periodically perform a registration or check-in process with an identity verifier, such as at intervals of between 1 day and 10 days, at intervals of no more than 10 days, at intervals of no more than two weeks, at intervals of no more than 15 days, and so forth. Such registration or check-in processes may operate to notify an identity verifier that the communicating device is capable of performing secure authentication-related communications operations using valid and/or current high-entropy tokens. However, responsive to a communicating device failing to perform registration and/or check-in processes, an identity verifier may infer that the security of the communicating device has been compromised. Accordingly, responsive to a communicating device failing to perform a registration or check-in process over a threshold number of intervals, such as consecutive intervals, an identity verifier may revoke a bind between or among an identity verifier and the communicating device. In particular embodiments, such revocation of a bind between or among an identity verifier and a communicating device may occur in response to the communicating device missing a threshold of between 1 and 10 registration or check-in intervals. Thus, for example, if a communicating device is scheduled to perform a registration or check-in process with an identity verifier at 1-day intervals, and if an identity verifier is configured or programmed to revise (e.g., degrade) a trustworthiness score responsive to the communicating device missing a threshold of 5 consecutive check-in intervals (e.g., 1-day), then the identity verifier may revise the trustworthiness score associated with the communicating device responsive to the communicating device failing to check-in or register over a 5-day interval. It should be noted that claimed subject matter is intended to embrace revocation of a bind between or among an identity verifier and a communicating device responsive to passage of any number of intervals (such as consecutive intervals) during which a communicating device has not checked in with an identity verifier.

FIG. 4 shows a communicating device indicating expiration of a component token followed by transmission of a fresh component token, according to an embodiment 400. As depicted in FIG. 4, responsive to communicating device 102 determining the imminent or approaching expiration of a component token, device 102 may indicate to an identity verifier, such as identity verifier 228 of FIG. 2, of the imminent (e.g., within a predetermined time period) expiration of the component token. Responsive to detection of the expiring token by an identity verifier, a fresh component token may be transmitted to communicating device 102.

Figure 5:
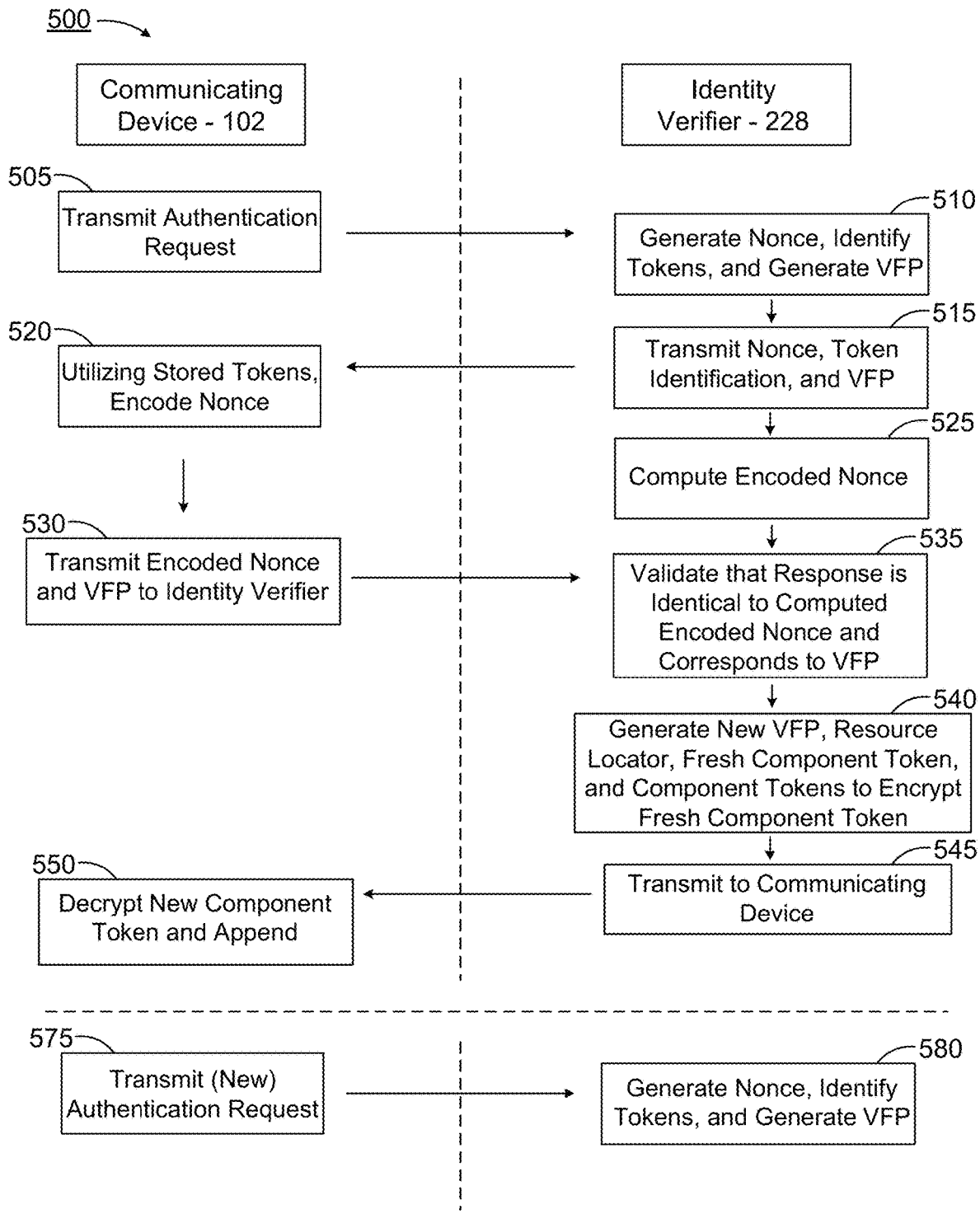
FIG. 5 shows a flowchart for a process of authenticating a communicating device utilizing an identity verifier, according to an embodiment.
Figure 8:
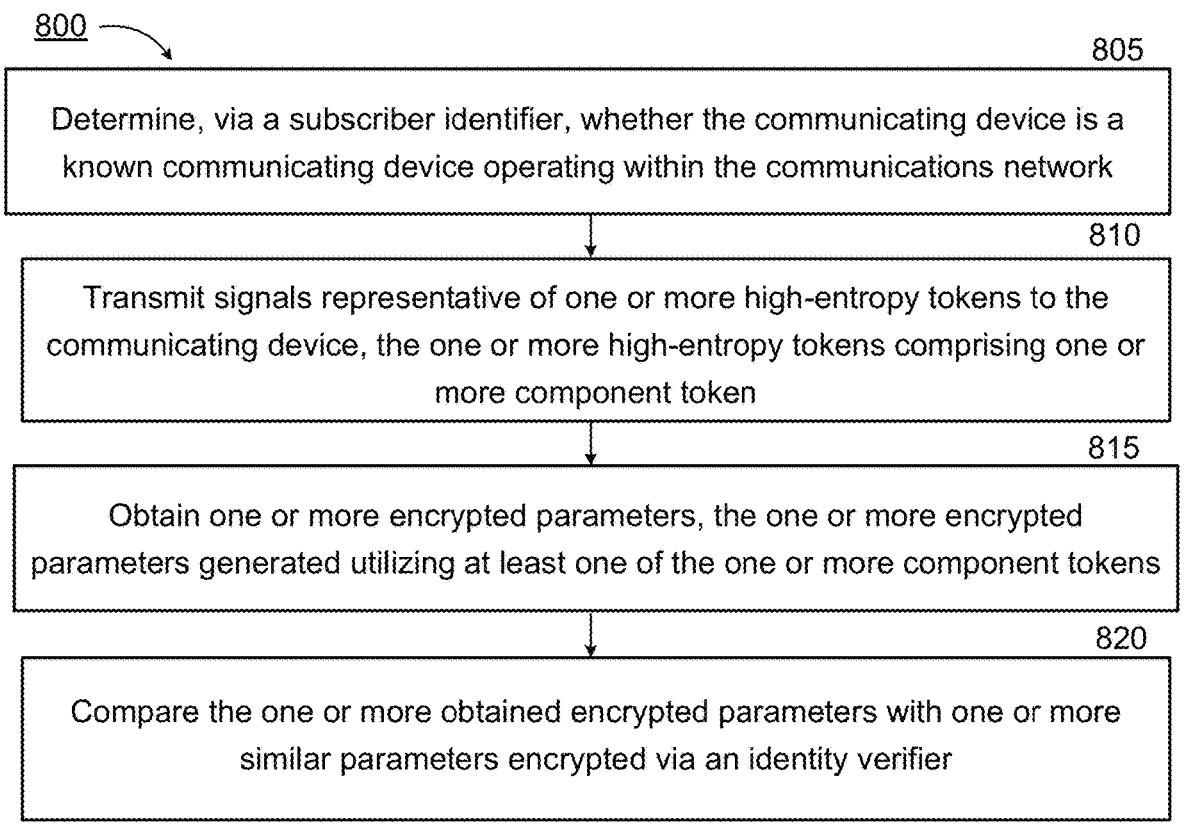

FIG. 5 shows a flowchart for a process of authenticating a communicating device utilizing an identity verifier, according to an embodiment 500. It should be noted that the disclosed embodiments, such as the embodiments of FIGS. 5, 7, and 8, are intended to embrace numerous variations, including methods that may include actions in addition to those depicted in the figures, actions performed in an order different than those depicted in the figures, as well as methods including fewer steps than those depicted. The method of FIG. 5 begins at 505, which includes a communicating device, such as communicating device 102, initiating an authentication process by way of transmitting an authentication request to identity verifier 228. An authenticating request from communicating device 102 may additionally include a UUID (e.g., 731212bf-1e5f-45e9-9c8e-3396611e4bec), which may represent an identifier unique to a specific communicating device. At 510, in response to receipt of a request for authentication, a computing resource of an identity verifier may generate a nonce (or other parameter), identify component tokens, and generate a verification fingerprint (VFP) for transmission to a communicating device.

In particular embodiments, a parameter, such as a nonce may correspond to a randomly-generated, or pseudo-randomly-generated, set of alphanumeric characters, for example, which are used during a single verification transaction between a communicating device and an identity verifier. For example, at block 510, a generated nonce may correspond to, for example, a set of 44 alphanumeric characters (e.g., MTlz NDU2 Nzg5 MDEy MzQ1 Njc4 OTAx MjMO NTY3 ODkw MTIK). In addition to generating a nonce, as previously alluded to, an identity verifier may identify component tokens to be utilized by the communicating device to encrypt a nonce. For example, at 510, an identity verifier may generate instructions for a communicating device to utilize 4 component tokens in a specific order (e.g., tokens 1, 3, 7, and 2, in such order). Further, and also as previously alluded to, an identity verifier may generate a verification fingerprint (e.g., m835dms23). At 515, the identity verifier may transmit the nonce, the component tokens to be utilized for encryption of the nonce, as well as the verification fingerprint, to the communicating device. At 525, which may occur prior to or in response to transmission of the nonce, component tokens, and the verification fingerprint, the identity verifier may compute an expected response a communicating device.

At 520 the communicating device may access stored component tokens in a particular order (e.g., tokens 1, 3, 7, and 2 in such order) as directed by the identity verifier, and encrypt the transmitted parameter (e.g., a nonce) utilizing the specified tokens. At 530, the communicating device may transmit the encrypted nonce along with the verification fingerprint (e.g., m835dms23) supplied by the identity verifier. At 535, the identity verifier may validate that the response from the communication device is identical to, or at least bears substantial similarity with, the computed encoded nonce and VFP generated at 525. It may be appreciated that 535 represents a validation of the communicating device via a comparison between an expected (e.g., server-computed) and a returned (communicating device-computed) encrypted nonce.

At 540, an identity verifier may generate a new verification fingerprint, resource locator, fresh component token, and identify component tokens to be utilized to encrypt a fresh component token. The new verification fingerprint, resource locator, fresh component token, and identification of component tokens may be transmitted to a communicating device at 545. In the example of FIG. 5, a new verification fingerprint may operate to maintain a previous communication session (e.g., a browser-based session) between a communicating device and an identity verifier. A resource locator generated at 540 may operate (perhaps in association with a header of a 307 temporary redirect status response code to indicate that a requested resource has been temporarily moved) to redirect the communication session. Responsive to such redirection, the identity verifier may provide a fresh component token, such as a 43-character token (e.g., amFu c2R2 cG40 MzU5 ODI2 ZHNh bjQz Mm90 Ym84 LWFk ZnM). The identity verifier may further provide instructions as to which tokens (e.g., tokens 8, 2, 5, and 9, in such order) are to be used to encrypt the fresh component token. At 550, the communicating device may decrypt the fresh component token, such as utilizing tokens 8, 2, 5, and 9 in such an order) and may append the fresh component token to the high-entropy token, such as described in reference to FIG. 3A-3C. The identity verifier may provide a fresh component token for various reasons such as, for example, in response to a communicating device announcing the imminent (e.g., within a predetermined time period) expiration of a component token stored within the communicating device.

Thus, it may be appreciated that 505-550 of FIG. 5 represents an approach toward authenticating a communicating device utilizing stored tokens to encrypt transmission of a parameter (e.g., a nonce) from a communicating device to an identity verifier. In addition, it may also be appreciated that transmission of fresh component tokens from an identity verifier to a communicating device, such as at 545, takes place utilizing encryption provided by existing component tokens accessible to the identity verifier and communicating device. Thus, the authentication process described at 505-550 remains secure. In particular embodiments, authentication of a communicating device and an identity verifier may generate, form, or create a bind between the identity verifier and the communicating device.

At 575, the process of embodiment 500 may continue, such as in regards to a new authentication request which may occur after a period of time has elapsed. At 575, a communicating device may transmit an authentication request to an identity verifier. At 580, an identity verifier may respond to the authentication request by generating a different parameter (e.g., N2J5 OTh veXV idnl OcjZ jZGF zY3Y wMTI zbmM 3aGN pdTY). Further, an identity verifier may identify different component tokens (e.g., tokens 2, 8, 3, and 1 applied in such order) to be utilized by a communicating device to encrypt the parameter. The process to authenticate a communicating device may operate similar to the process described at 510-550 so as to maintain secure communications of authentication parameters between a communicating device and an identity verifier. It may be appreciated that one or more of 505, 530, 575, etc., which involve transmission of authentication requests, parameters (e.g., one or more nonces), verification fingerprints, and so forth, may be accompanied by a UUID, subscriber account identifier, IMSI, NEI, and/or a MSISDN. Transmission of such device-specific identifiers may operate to provide notification and/or confirmation to an identity verifier of the particular communicating device requesting authentication.

FIG. 6 is a diagram of communicating devices forming a "persona," in which the persona may be authenticated, according to an embodiment 600. In the embodiment of FIG. 6, identity verifier 228 may interact with communicating device 102 so as to authenticate device 102. In particular embodiments, authentication of communicating device 102 by identity verifier 228 may operate to form a bind between the identity verifier and the communicating device. In the embodiment of FIG. 6, communicating device 102 may represent a mobile cellular communications device whose primary function is to provide wireless communications within a communications infrastructure. Thus, as described in reference to FIGS. 1-5 herein, identity verifier 228 may cooperate with communicating device 102 so as to create a bind between the communicating device and the identity verifier.

In the embodiment of FIG. 6, a bind between identity verifier 228 and communicating device 102 may be extendable to one or more additional communicating devices that form a "persona" of devices in the custody of, or at least within a span of control of, a particular mobile subscriber. In the embodiment of FIG. 6, the persona of devices, such as 102, 102A, 102B, and/or any other devices that may form a "web" of devices with in the span of control of a particular subscriber, may possess a single subscriber identifier. A single subscriber identifier may comprise, for example, a MSISDN or may comprise a unique alias assigned by an identity verifier (e.g., identity verifier 228). Thus, for example, in accordance with the process described in reference to FIG. 5, a mobile subscriber may interact, such as by way of a communicating device, with an identity verifier to authenticate the communicating device. Such authentication may operate to form a bind between the communicating device and the identity verifier. In addition, in accordance with FIG. 6, responsive to an additional subscriber communicating device, such as IOT device 102A, laptop computer 102B, etc., also being in the custody of, within the span of control of, or otherwise accountable to the subscriber, may also form a bind to identity verifier 228. Formation of a bind between identity verifier 228 and potentially all devices (e.g., communicating device 102 and additional communicating devices 102A-102X) forming the persona of devices within the span of control of a particular mobile subscriber may bring about transfer of high-entropy tokens between the identity verifier and the additional communicating devices of the persona. As shown in FIG. 6, identity verifier 228 may assign a UUID to some or all of devices 102A-102X. Identity verifier 228 may maintain, such as within an internal memory or in a memory accessible to identity verifier 228, a table of assigned UUIDs (e.g., UUID_1, UUID_2, and UUID_3) that correspond to a particular mobile subscriber in possession with, for example, communicating device 102.

In particular embodiments, a first communicating device of the persona depicted in FIG. 6 may be utilized to authenticate a second communicating device of the persona. For example, in response to device 102X attempting to communicate with identity verifier 228 utilizing one or more expired component tokens, identity verifier 228 may revoke a bind with device 102X. However, identity verifier 228 may additionally determine that device 102X is associated with a subscriber account identifier for communicating device 102, which corresponds to a device within the same persona. In such an instance, identity verifier 228 may leverage an existing authentication of communicating device 102 to re-authenticate device 102X. For example, in response to identity verifier 228 determining that device 102X is within the same persona as communicating device 102, identity verifier 228 may transmit a one-time password to the communicating device, which may then be entered into a user interface of device 102X. In response, identity verifier 228 may determine that device 102X is within the same persona (e.g., "web") as communicating device 102, which may be sufficient to re-authenticate device 102X. Following re-authentication of device 102X, identity verifier 228 may transmit one or more fresh component tokens, for example, to device 102X. Such fresh component tokens may permit device 102X to maintain periodic or occasional contact with identity verifier 228.

FIG. 7 is a flowchart for a process of device authentication via a high-entropy token according to an embodiment 700. The embodiment of FIG. 7 may begin at 710, which may include obtaining, such as at a communicating device, signals representative of one or more high-entropy tokens via the communications network. The one or more high-entropy tokens obtained at 710 may comprise one or more component tokens. The process may continue at 715, which may include the communicating device encrypting, such as via a first encryption key derived from at least one component token of the one or more component tokens, one or more messages that may be transmitted from the communicating device to an identity verifier. 720 may include the transmitting, via the communications network, one or more signals representative of the encrypted one or more parameters. The one or more parameters transmitted at 720 may correspond to a nonce, for example. The method may continue at 725, which may include obtaining, at the communicating device, one or more signals indicating an outcome of a comparison between the one or more encrypted parameters with one or more similar parameters encrypted by an identity verifier.

FIG. 8 is a flowchart for a process of device authentication via a high-entropy token according to an embodiment 800. The process of FIG. 8 may begin at 805, which may include determining, such as at an identity verifier via a subscriber identifier, whether a communicating device is a known communicating device operating within the communications network. The process may continue at 810, which may include transmitting signals representative of one or more high-entropy tokens to the communicating device. The one or more high-entropy tokens may comprise one or more component tokens. The process may continue at 815, which may include obtaining one or more encrypted parameters (e.g., one or more nonces) generated utilizing at least one of the one or more component tokens. The method may continue at 820, which may include comparing the one or more obtained encrypted parameters with one or more similar parameters encrypted via an identity verifier.

Figure 9:
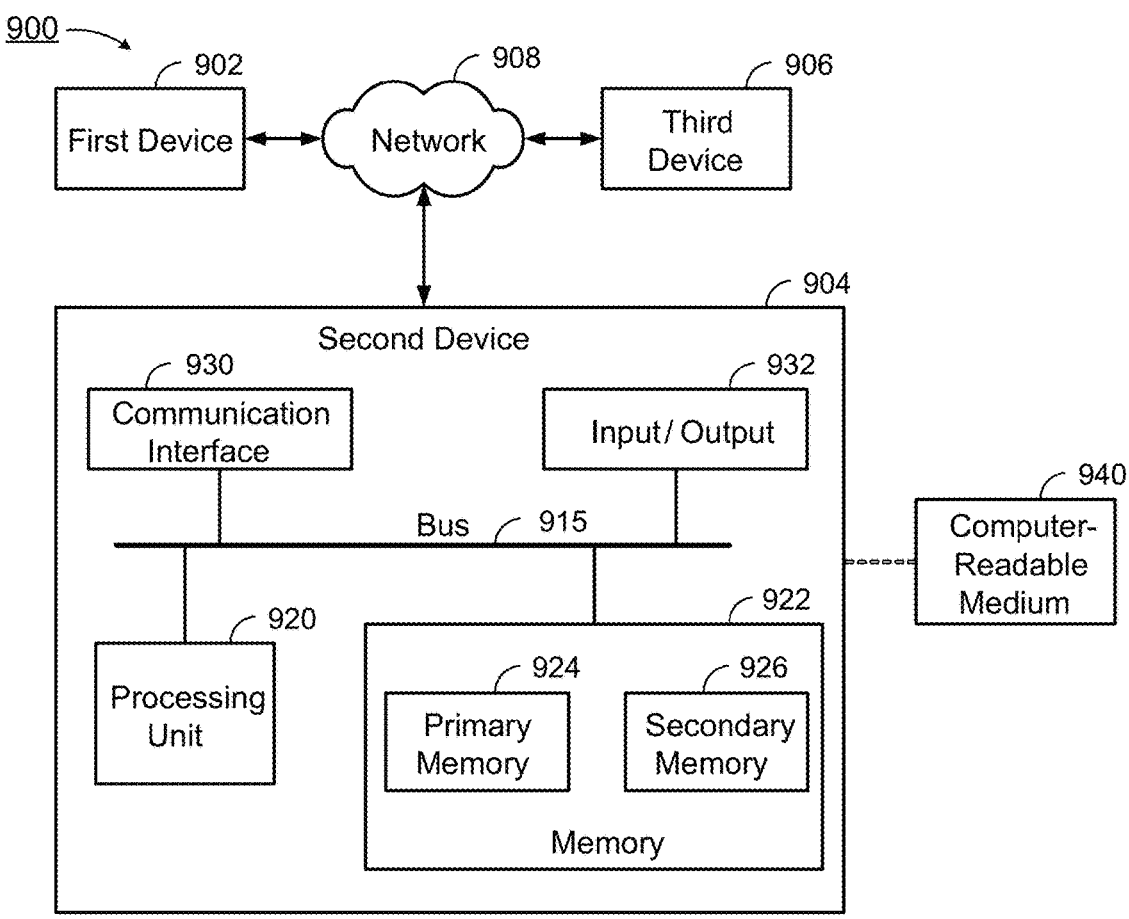
FIG. 9 is a diagram showing a computing environment, according to an embodiment.

FIG. 9 is a diagram showing a computing environment, according to an embodiment 900. In the embodiment of FIG. 9, first and third devices 902 and 906 may be capable of rendering a graphical user interface (GUI) for a network device, such as server device 140 of FIG. 1, so that a subscriber utilizing a communicating device (e.g., a mobile cellular communications device, an IOT device, etc.) may engage in system use. Device 904 may potentially serve a similar function in this illustration. Likewise, in FIG. 9, computing device 902 ('first device' in FIG. 9) may interface with computing device 904 ('second device' in FIG. 9), which may, for example, also comprise features of a client computing device and/or a server computing device, in an embodiment. Processor (e.g., processing device) 920 and memory 922, which may comprise primary memory 924 and secondary memory 926, may communicate by way of a communication interface 930, for example. The term "computing device," or "computing resource" in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 904, as depicted in FIG. 9, is merely one example, and claimed subject matter is not limited in scope to this particular example.

In FIG. 9, computing device 902 may provide one or more sources of executable computer instructions in the form of physical states and/or signals (e.g., stored in memory states), for example. Computing device 902 may communicate with computing device 904 by way of a network connection, such as via network 908, for example. As previously mentioned, a connection, while physical, may be virtual while not necessarily being tangible. Although computing device 904 of FIG. 9 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 922 may comprise any non-transitory storage mechanism. Memory 922 may comprise, for example, primary memory 924 and secondary memory 926, additional memory circuits, mechanisms, or combinations thereof may be used. Memory 922 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 922 may comprise one or more articles utilized to store a program of executable computer instructions. For example, processor 920 may fetch executable instructions from memory and proceed to execute the fetched instructions. Memory 922 may also comprise a memory controller for accessing device readable-medium 940 that may carry and/or make accessible digital content, which may include code, and/or instructions, for example, executable by processor 920 and/or some other device, such as a controller, as one example, capable of executing computer instructions, for example. Under direction of processor 920, a non-transitory memory, such as memory cells storing physical states (e.g., memory states), comprising, for example, a program of executable computer instructions, may be executed by processor 920 and able to generate signals to be communicated via a network, for example, as previously described. Generated signals may also be stored in memory, also previously suggested.

Memory 922 may store electronic files and/or electronic documents, such as relating to one or more users, and may also comprise a machine-readable medium that may carry and/or make accessible content, including code and/or instructions, for example, executable by processor 920 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 920 may comprise one or more circuits, such as digital circuits, to perform at least a portion of a computing procedure and/or process. By way of example, but not limitation, processor 920 may comprise one or more processors, such as controllers, micro-processors, micro-controllers, application specific integrated circuits, digital signal processors, programmable logic devices, field programmable gate arrays, the like, or any combination thereof. In various implementations and/or embodiments, processor 920 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 9 also illustrates device 904 as including a component 932 operable with input/output devices, and communication bus 915, for example, so that signals and/or states may be appropriately communicated between devices, such as device 904 and an input device and/or device 904 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more communicating devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a client server device and/or a communicating device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a communicating device and/or a client server device in various embodiments. Network devices capable of operating as a client server, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a communicating device, as well as other types of devices, including between wired and/or wireless devices coupled via a wired and/or wireless network, for example, or any combination thereof. It is noted that the terms, server, server device, server computing device, server computing platform and/or similar terms are used interchangeably.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

The term electronic file and/or the term electronic document are used throughout this document to refer to a set of stored memory states and/or a set of physical signals associated in a manner so as to thereby, at least logically, form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a subscriber, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a communicating device application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of authenticating a communicating device via a communications network, the method comprising:
    obtaining, at the communicating device, signals representative of one or more high-entropy tokens via the communications network, the one or more high-entropy tokens comprising one or more component tokens;
    encrypting one or more parameters utilizing a first encryption key derived from at least one component token of the one or more component tokens;
    transmitting, via the communications network, one or more signals representative of the encrypted one or more parameters; and
    obtaining, at the communicating device, one or more signals indicating an outcome of a comparison between the one or more encrypted parameters with one or more similar parameters encrypted by an identity verifier.

2. The method of claim 1, further comprising generating an additional encryption key based, at least in part, on at least one fresh component token.

3. The method of claim 2, wherein generating the additional encryption key is based, at least in part, on at least one component token of the one or more component tokens in combination with the at least one fresh component token.

4. The method of claim 3, wherein transmitting the one or more signals is to indicate that at least one expiring component token, of the one or more component tokens, is expiring within a predetermined time period.

5. The method of claim 4, further comprising generating at least one fresh high-entropy token based, at least in part, on the at least one fresh component token.

6. The method of claim 5, wherein generating the at least one fresh high-entropy token comprises:
    appending the at least one fresh component token to a high-entropy token of the one or more high-entropy tokens; and
    discarding the at least one expiring component token.

7. The method of claim 1, further comprising:
    transmitting one or more signals to indicate at least one expiring component token; and
    transmitting a signal representative of a parameter specific to the communicating device.

8. A method of authenticating a communicating device via a communications network, comprising:
    determining, via a subscriber identifier, whether the communicating device is a known communicating device operating within the communications network;
    transmitting signals representative of one or more high-entropy tokens to the communicating device, the one or more high-entropy tokens comprising one or more component tokens;
    obtaining one or more encrypted parameters, the one or more encrypted parameters generated utilizing at least one of the one or more component tokens; and
    compare the one or more obtained encrypted parameters with one or more similar parameters encrypted via an identity verifier.

9. The method of claim 8, further comprising
    determining that at least one component token is to expire based, at least in part, on one or more indications from the communicating device that a time-to-live parameter is scheduled to expire within a predetermined time period.

10. The method of claim 9, further comprising:
responsive to determining that at least one component token has expired, generating a fresh high-entropy token by:
appending at least one fresh component token to a portion of a high-entropy token of the one or more high-entropy tokens; and
discarding the at least one expired component token.

11. The method of claim 9, wherein the one or more indications from the communicating device are received within a period of no more than 10 days.

12. The method of claim 11, further comprising:
generating an upgraded trustworthiness score responsive to receiving the one or more indications received within the period of no more than 10 days.

13. The method of claim 9, further comprising:
revoking a bind between or among the identity verifier and the communicating device responsive to passage of a threshold number of consecutive intervals without receipt of at least one indication, of the one or more indications, from the communicating device.

14. The method of claim 13, further comprising:
generating a degraded trustworthiness score corresponding to the communicating device responsive to revoking the bind between or among the identity verifier and the communicating device.

15. The method of claim 8, further comprising:
in response to detecting that a high-entropy token is currently in use by more than one communicating device:
invalidating the high-entropy token.

16. The method of claim 15, further comprising:
transmitting a one-time password exclusively to a communicating device of the more than one communicating devices; and
transmitting a previously unused high-entropy token to the communicating device of the more than one communicating devices.

17. The method of claim 15, further comprising:
accessing a data store comprising the subscriber identifier and an Internet protocol address corresponding to the communicating device.

18. The method of claim 8, further comprising:
authenticating one or more additional communicating devices via:
transmitting a one-time password to the one or more additional communicating devices or to the known communicating device;
establishing a communications link between the one or more additional communicating devices; and
obtaining the one-time password via the established communication link.

19. The method of claim 18 further comprising:
transmitting signals representative of one or more additional high-entropy tokens to the one or more additional communicating devices responsive to authenticating, wherein the one or more additional communicating devices correspond to devices having a universally unique identifier (UUID) assigned by the identity verifier.

20. An apparatus comprising:
a processor coupled to at least one memory device to:
obtain, at a communicating device, signals representative of one or more high-entropy tokens transmitted via a communications network, the one or more high-entropy tokens comprising one or more component tokens;
encrypt, utilizing a first encryption key derived from at least one component token of the one or more component tokens, one or more parameters to be transmitted from the communicating device to an identity verifier;
transmit, via the communications network, one or more signals representative of the encrypted one or more parameters; and
obtain, at the communicating device, one or more signals indicating an outcome of a comparison between the encrypted one or more parameters with one or more similar parameters encrypted by the identity verifier.

21. The apparatus of claim 20, wherein the processor coupled to the at least one memory is additionally to:
transmit, within a period of no greater than 10 days, one or more indications that at least one component token of the one or more component tokens is to expire within a predetermined time period.

22. The apparatus of claim 20, wherein the processor coupled to the at least one memory device to transmit one or more signals to indicate at least one expiring component token is additionally to:
transmit a signal representative of a parameter specific to the communicating device.

23. The apparatus of claim 20, wherein the processor coupled to the at least one memory is additionally to:
generate an additional encryption key based, at least in part, on at least one fresh component token obtained at the communicating device responsive to expiration of at least one component token of the one or more component tokens.

24. The apparatus of claim 23, wherein the processor coupled to the at least one memory is additionally to:
generate at least one fresh high-entropy token based, at least in part, on the at least one fresh component token.

25. An apparatus to authenticate a communicating device via a communications network, comprising:
a processor coupled to at least one memory to:
recognize, via a subscriber identifier, the communicating device as a known device operating within the communications network;
transmit signals representative of one or more high-entropy tokens to the communicating device, the one or more high-entropy tokens comprising one or more component tokens;
obtain one or more encrypted parameters, the one or more encrypted parameters generated utilizing at least one of the one or more component tokens; and
compare the one or more obtained encrypted parameters with one or more similar parameters encrypted via an identity verifier.

26. The apparatus of claim 25, wherein the processor coupled to the at least one memory is additionally to:
receive, within a period of no more than 10 days, one or more indications of at least one expiring component token.

27. The apparatus of claim 26, wherein the processor coupled to the at least one memory is additionally to:
generate an upgraded trustworthiness score responsive to receipt of the one or more indications.

28. The apparatus of claim 26, wherein the processor coupled to the at least one memory is additionally to:
responsive to detecting expiration of at least one component token of the one or more component tokens, generate a fresh high-entropy token by appending the at least one fresh component token to a portion of a high-entropy token of the one or more high-entropy tokens.

29. The apparatus of claim 25, wherein the processor coupled to the at least one memory is additionally to:
revoke a bind between or among the identity verifier and the communicating device responsive to passage of a time period greater a threshold number of days without receipt of one or more indications of at least one expiring token.

30. The apparatus of claim 29, wherein the threshold number of days corresponds to no more than 10 days.

* * * * *